United States Patent [19]
Forster

[11] 3,967,500
[45] July 6, 1976

[54] MAGNETIC TRANSIT-TIME FLOWMETER

[75] Inventor: George A. Forster, Westmont, Ill.

[73] Assignee: The United States of America as represented by the United States Energy Research and Development Administration, Washington, D.C.

[22] Filed: May 29, 1975

[21] Appl. No.: 581,607

[52] U.S. Cl. .......................... 73/194 EM; 73/194 E
[51] Int. Cl.² ........................................... G01F 1/58
[58] Field of Search ................... 73/194 E, 194 EM

[56] References Cited
UNITED STATES PATENTS

| | | | |
|---|---|---|---|
| 2,637,207 | 5/1953 | DeBoisblanc | 73/194 EM |
| 2,782,369 | 2/1957 | Werner et al. | 73/194 EM X |
| 3,595,078 | 7/1971 | Beck | 73/194 F |
| 3,789,663 | 2/1974 | Gold | 73/194 E X |

FOREIGN PATENTS OR APPLICATIONS

802,017   9/1958   United Kingdom ............ 73/194 EM

Primary Examiner—Charles A. Ruehl
Attorney, Agent, or Firm—Dean E. Carlson; Arthur A. Churm; Donald P. Reynolds

[57] ABSTRACT

The flow rate of a conducting fluid in a stream is determined by disposing two permanent-magnet flowmeters in the stream, one downstream of the other. Flow of the conducting fluid causes the generation of both d-c and a-c electrical signals, the a-c comprising flow noise. Measurement of the time delay between similarities in the a-c signals by cross-correlation methods provides a measure of the rate of flow of the fluid.

8 Claims, 8 Drawing Figures

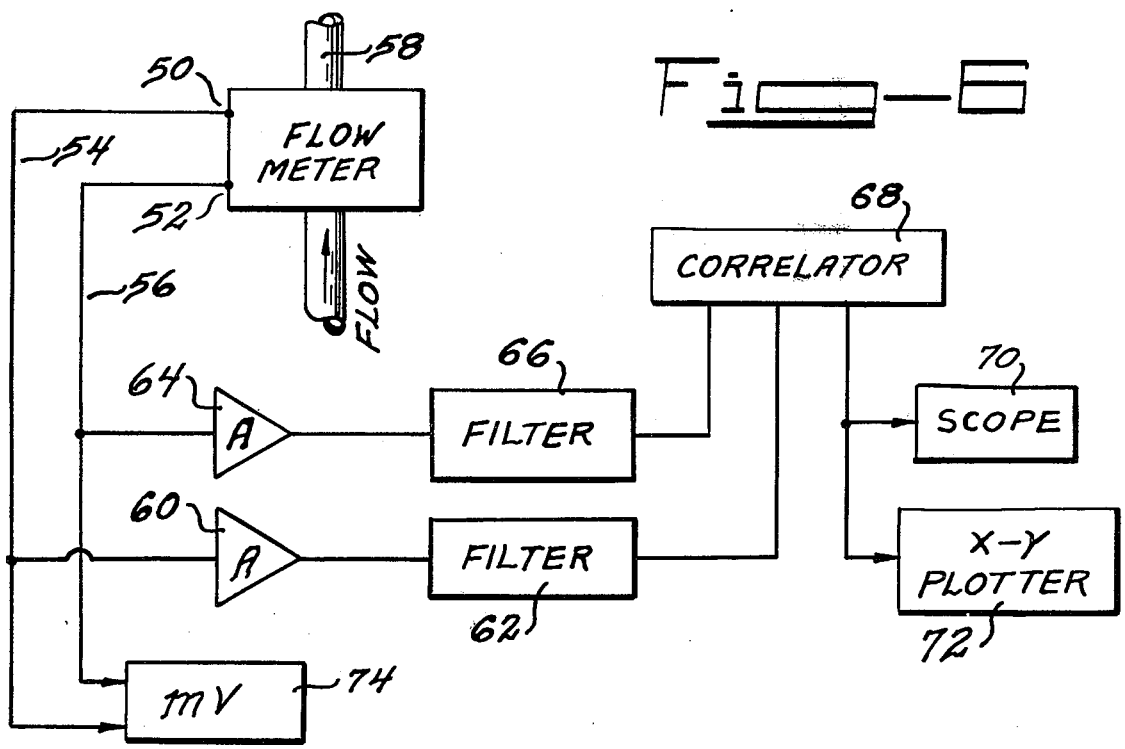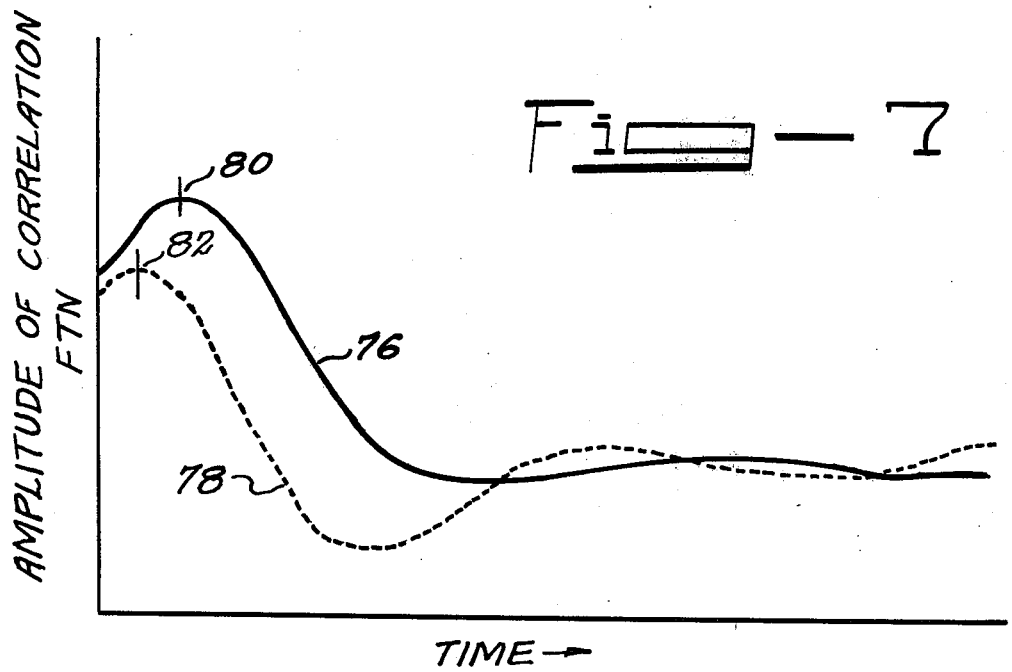

3,967,500

MAGNETIC TRANSIT-TIME FLOWMETER

CONTRACTUAL ORIGIN OF THE INVENTION

The invention described herein was made in the course of, or under, a contract with the United States Energy Research and Development Administration.

BACKGROUND OF THE INVENTION

The permanent-magnet flowmeter has proved to be very satisfactory for measuring flow of electrically conducting fluids in extreme environments such as those experienced by liquid sodium in a liquid-metal nuclear reactor. However, the response fo such flowmeters is a function of the magnetic field strength of the permanent magnet in the flowmeter, and any change affecting this magnet is accompanied by a corresponding change in the response characteristics of the flowmeter. The permanent magnet is in an environment of high temperature and frequently of relatively high nuclear radiation and therefore changes in the magnetic field strength are the rule rather than the exception. The same conditions that produce such changes also make it frequently difficult to calibrate and recalibrate such flowmeters. What is needed is a system that allows use of the permanent magnet flowmeter while allowing it to be readily recalibrated against an absolute standard as often as is necessary to preserve reliability of its reading.

Many other methods of measuring the flow of liquid metals are in use or under consideration, including eddy-current devices, turbines, orifice methods for converting pressure drops to velocities and hence to flow rates, and thermal transit-time devices. All but the thermal transit-time devices are extensions to liquid-metal uses of devices well known in other applications that measure fluid flow. The thermal transit time method determines the correlation between a-c electrical signals from two thermocouples separated from each other along the axis of a flow channel. The thermocouples are selected for fast time response. However, the term "fast time response" is relative and the time required to achieve sufficient measurements to determine statistical correlation to a satisfactory degree of probability is still of the order of minutes. This requires that the velocity of flow in a channel remain unchanged over the period necessary to gather data for correlation and it renders the thermocouple method unsatisfactory for providing loss-of-flow or change-of-flow information in situations in which a rapid response is desired.

It is an object of the present invention to provide a better measure of the flow of a conducting fluid.

It is a further object of the present invention to provide a method of calibrating a permanent-magnet sodium flowmeter.

It is a further object of the present invention to provide a method and means of measuring the flow of an electrically conducting fluid that is absolute, fast, and reliable.

It is a further object of the present invention to provide a better method of monitoring the flow of a conducting liquid metal in a nuclear reactor.

Other objects will become apparent in the course of a detailed description of the invention.

SUMMARY OF THE INVENTION

Two permanent magnet flowmeters are disposed axially, one downstream of the other, in a flow channel of an electrically conducting fluid. The a-c components of the electrical signals detected by the two flowmeters in response to fluid flow are applied to variable time delays and to a statistical correlator. The time delays are adjusted to provide maximum correlation between the two signals. The difference in time between the two signals associated with the maximum value of the correlation is a measure of the time taken for fluid to flow between the two flowmeters. The ratio of the distance between the two flowmeters to the time thus determined is the velocity of fluid flow in the flow channel.

BRIEF DESCRIPTION OF THE DRAWINGS

FIG. 6 is a block diagram of an electronic circuit for the practice of the present invention.

FIG. 7 is a plot of the correlation between probe signals for two different flow rates.

DETAILED DESCRIPTION OF THE INVENTION

Figure 1:
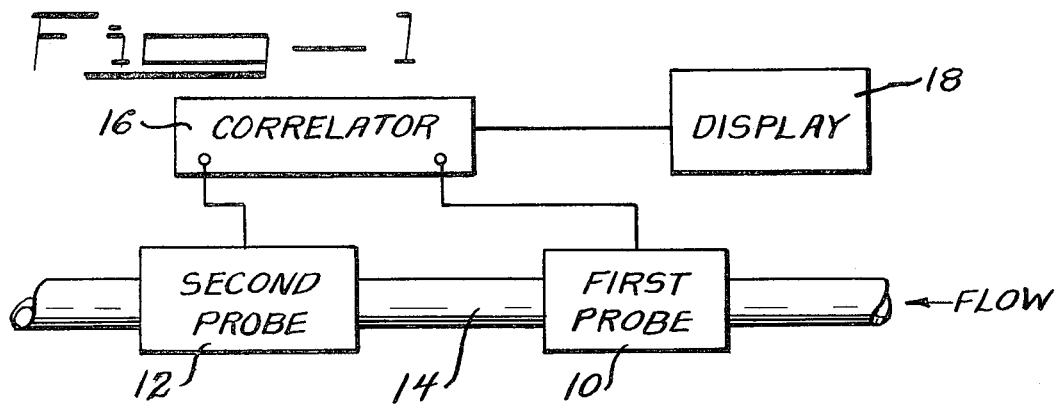
FIG. 1 is a functional block diagram of an apparatus for the practice of the present invention.

FIG. 1 is a block diagram indicating the operation of the present invention. In FIG. 1, first probe 10 and second probe 12 are disposed in flow channel 14, separated by a distance L. First probe 10 and second probe 12 are taken to be conventional electromagnetic probes which detect the electrical signal generated by the flow of a conducting fluid through the field of a magnet. Signals detected by first probe 10 and second probe 12 are conducted to correlator 16 which includes the functions of filtering and delay as necessary and which is adapted to determine the statistical cross-correlation between the signals from first probe 10 and second probe 12. The correlation signal is coupled to display means 18 which is calibrated to provide a measure of the velocity of flow in flow channel 14.

Figures 2, 3:
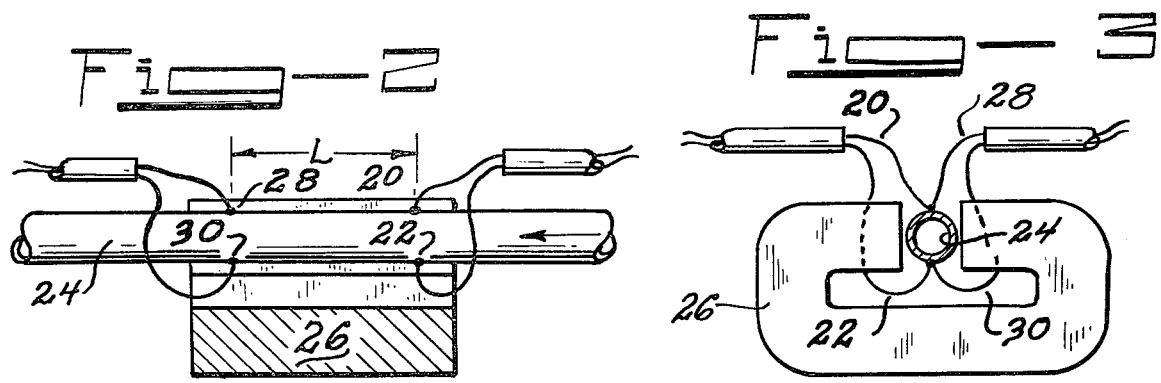
FIGS. 2 and 3 are, respectively, a partial sectional side view and an end view of a single-magnet flow-through apparatus for the practice of the present invention.

While in principle the outputs of two flowmeters are necessary for the practice of the present invention, it is possible to combine the two into a single unit, as shown in FIGS. 2 and 3. FIG. 2 is a partial sectional side view of a flow-through unit embodying two sets of probes combined into a unitary structure using a single magnet. FIG. 3 is an end view of the structure shown in FIG. 2. In FIGS. 2 and 3, first electrode 20 and second electrode 22 form together a pair of electrodes to probe and sense the flow in flow channel 24 by measuring the electric field generated by the passage of an electrically conducting fluid through flow channel 24 in the magnetic field set up by magnet 26. Magnet 26 is here indicated for convenience as a permanent magnet, although it is evident that an electromagnet would function equally as well. Third electrode 28 and fourth electrode 30 are disposed in electrical contact with the conducting fluid in flow channel 24 and are disposed axially a distance L from the location of first electrode 20 and second electrode 22. Third electrode 28 and fourth electrode 30 comprise together a second probe to sense the electric field existing between them as a result of the flow of a conducting fluid in flow channel 24 responsive to the magnetic field of magnet 26. When the conducting fluid flowing in flow channel 24 is liquid metal such as liquid sodium, liquid potassium, NaK, their eutectic mixture, or other liquid metals that have been proposed and used as heat-exchange media in nuclear reactors, then the conventional electromagnetic flowmeter formed by first electrode 20, second electrode 22 and magnet 26 is operated under severe conditions of temperature, radiation and inaccessibility. The same is true of the conventional electromagnetic flowmeter comprising third electrode 28, fourth electrode 30 and magnet 26. The response of each of the flowmeters thus described is subject to variation from a number of causes including most particularly any change in the magnetic field set up by magnet 26. The signal detected by first electrode 20 and second electrode 22 in response to the flow of a conducting fluid in the magnetic field of magnet 26 will in general have two parts, a d-c part and an a-c part. The d-c part is the conventional dynamo voltage generated in response to the motion of a conductor through the magnetic field. The a-c part has been observed to consist of noise as a randomly varying component on top of the d-c component. The a-c component is caused by fluid turbulence in the flow stream. It has been further observed that the a-c part is quite small and accompanied by electric power supply signals at harmonics of 60 Hz. Where this exists, it is usually possible and desirable to remove this component by filtering in the correlator or before. When the 60-Hz component is removed, the remaining a-c signal has been observed to exhibit a measurable statistical correlation with the a-c signal from a comparable set of probes located axially a distance upstream or downstream from the first probe. This correlation has proved to be a reliable and repeatable measure of the velocity of flow in flow channel 24. Further, the fact that this correlation independent of the constancy of the magnetic field of magnet 26, of the conductivity of the fluid in flow channel 24, of its temperature and of other variables, at least over the period necessary to perform a correlation measurement, thus provides an absolute measurement of the velocity of the flow in flow channel 24. It is evident therefore that the apparatus of FIGS. 2 and 3 is capable of fulfilling two useful functions. The first is to provide a measure of the velocity of flow in a flow channel that is independent of random variations of parameters other than flow in the flow channel. The other function is to serve as an independent absolute means of calibration of a d-c probe without the necessity of removing the probe from the flow channel and calibrating it against an independently known measure of flow of fluids that are unpleasant to handle in conditions that are difficult to simulate.

Figure 4:
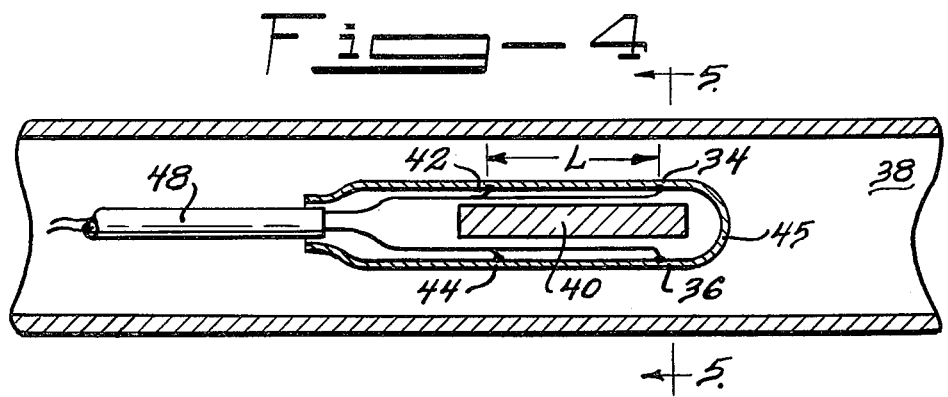
FIGS. 4 and 5 are, respectively, a partial sectional side view and a sectional end view of a single magnet probe for the practice of the present invention.
Figure 5:
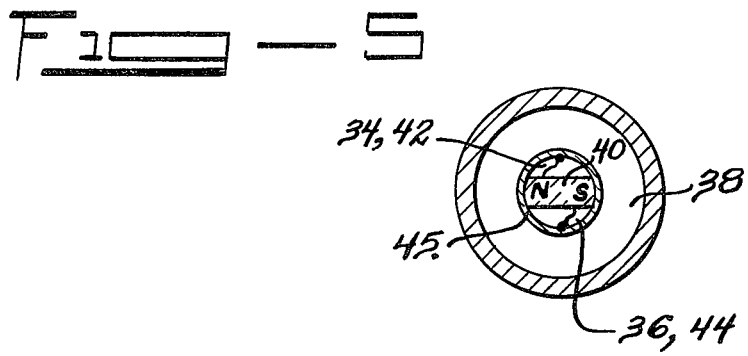

An alternate embodiment of the present invention comprising a combined pair of probe flowmeters is shown in FIGS. 4 and 5. FIG. 4 is a partial sectional side view of a probe for the practice of the present invention in place in a flow channel and FIG. 5 is a partial sectional end view of the probe of FIG. 4, taken along section lines 5—5. In FIGS. 4 and 5, first electrode 34 and second electrode 36 are disposed in contact with flow channel 38 in the field of magnet 40. First electrode 34 and second electrode 36 together comprise a first probe responsive to the flow of a conducting fluid in flow channel 38. Third electrode 42 and fourth electrode 44 are disposed in the same cross-sectional plane of flow channel 38 and are located an axial distance L from first electrode 34 and second electrode 36 so that third electrode 42 and fourth electrode 44 form together with the electric field of magnet 40 a second electromagnetic flowmeter. Electrodes 34, 36, 42 and 44 are disposed in and make electrical contact through cover 45 which provides electrical insulation of each electrode from the others and which also provides protection of magnet 40 from contact with the conducting fluid in flow channel 38. Electrodes 34, 36, 42 and 44 are connected electrically to conductor cable 48 which is sealed to cover 46 and which serves to conduct the electrical signals detected by the electrodes to signal processing means for amplification, filtering, correlation and display.

The processing and display are further illustrated in FIG. 6 which is a block diagram of a measuring installation that was used to make measurements according to the principle of the present invention. In FIG. 6, first probe 50 and second probe 52 are connected by cables 54 and 56, respectively, to conduct signals responsive to the flow of an electrically conducting fluid in flow channel 58. First probe 50 and second probe 52 may be the flow-through type of FIGS. 2 and 3 or the probe type of FIGS. 4 and 5. In either case, the signal detected by first probe 50 is conducted through cable 54 to a first amplifier 60 where the signal is amplified. First amplifier 60 must be able to respond to a-c signals. The output from first amplifier 60 is applied to filter 62 if necessary to attenuate or remove unwanted components such as harmonics of a 60-Hz signal or other power-supply frequency from the amplified output. These often result from motor-driven pumps. The signal from second probe 52 proceeds similarly through cable 56 to second amplifier 64 and filter 66, which also attenuates or removes unwanted components. The outputs from filters 62 and 66 are applied to correlator 68. One example of commercial equipment that was used for correlator 68 is the Hewlett-Packard 3721A. This is an apparatus that generates a correlation function between two input signals. The time taken to generate a correlation function is in part related to the frequency of the input signal and also to the degree of correlation between the two but is in general a time of the order of a minute. During this time, the correlation function can be seen to build up on viewing means such as scope 70. It is usually desirable to make a record of the correlation function obtained from correlator 68 and this may be done either by use of a memory feature on scope 70 or by recording the correlation function on X-Y plotter 72. Millivoltmeter 74 is used to measure the d-c signal. The d-c signal is divided by the fluid velocity determined from the correlation time delay to obtain the calibration factor for the flowmeter in terms of millivolts per unit volume per unit time.

Interpretation of the results will be demonstrated by referring to FIG. 7 which is a reproduction of an actual plot of two correlation functions obtained on an equipment setup similar to that of FIG. 6. In FIG. 7, the ordinate is the amplitude of correlation functions and the abscissa is time delay. Two correlation functions are shown in FIG. 7. First correlation function 76 was obtained from measurements on a fluid stream of a particular velocity and second correlation function 78 was obtained from a faster fluid stream. The velocities of the two streams are measured by determining the times from the origin of the curve to peak 80 for curve 76 and from the origin of the curve to peak 82 for curve 78. Referring again to FIGS. 2 and 4, the distance L shown therein when divided by the appropriate time from the origin to the peak shown in FIG. 7 is equal to the velocity of fluid flow in the flow channel for which the correlation function was obtained. As stated earlier, this measurement requires only that no change occur in the system parameters or the flow rate during the time necessary to obtain a correlation function, which time is of the order of a minute. The velocity measurement thus obtained is without reference to any physical properties except the separation between probes. Correspondingly, the quantity of flow that is determined from the velocity is a function only of the quantities mentioned and the cross-sectional area of the fluid flow channel. It is therefore unnecessary to accomplish calibration, either by comparison with other flowmeters or by removal of the flow-measuring equipment from its measuring location.

Figure 8:
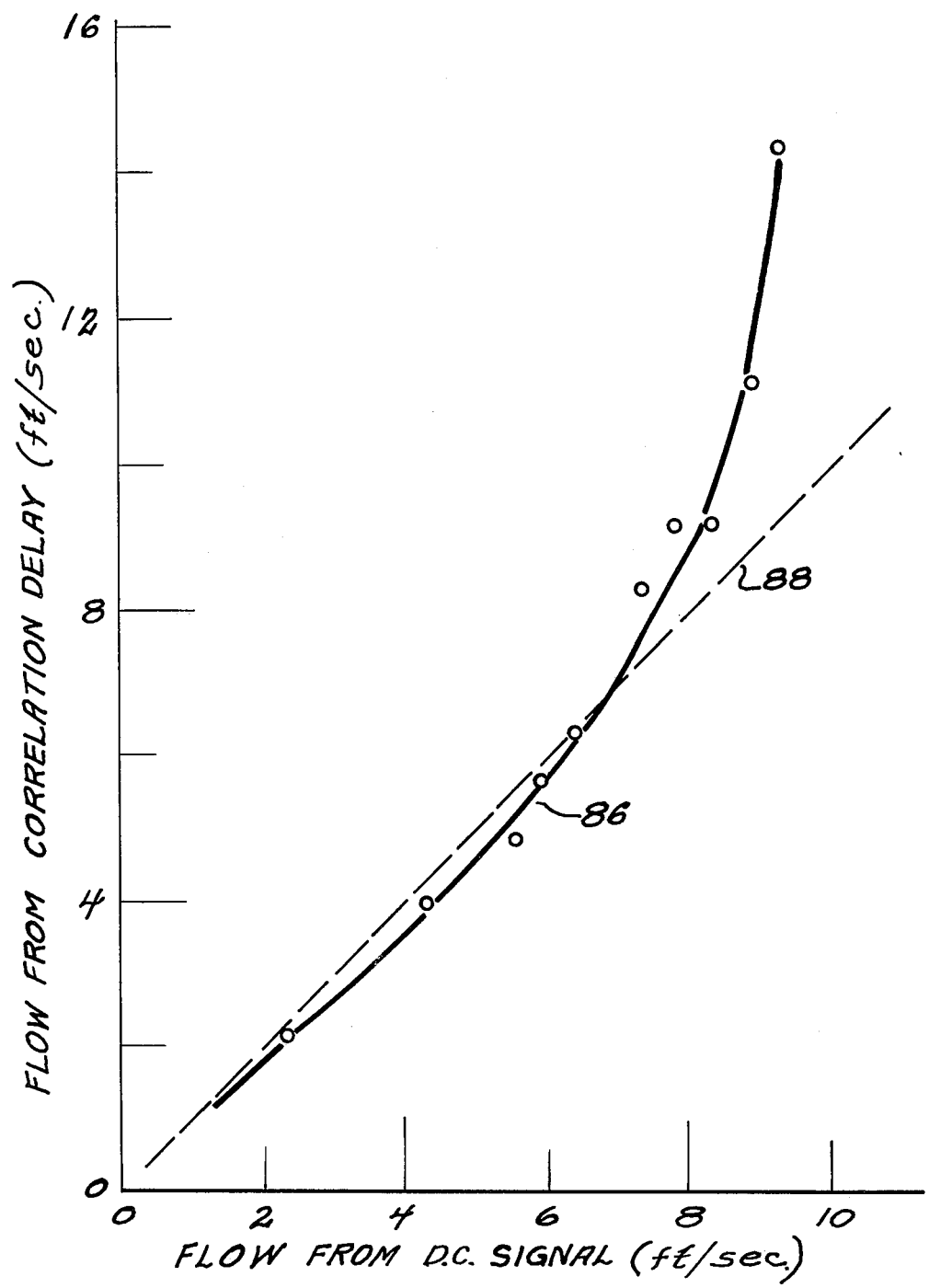
FIG. 8 is a plot of the flow rate obtained by correlation delay against the value obtained from a d-c flowmeter signal.

FIG. 8 is a plot showing a comparison of velocities obtained by the apparatus of FIG. 6 compared with the velocities obtained by the use of a conventional magnetometer probe in the same flow channel. The ordinate and abscissa of FIG. 8 are plotted to the same velocity scale so that complete agreement would be represented by points along a 45° angle. It can be seen from FIG. 8 that the points of curve 86 are in substantial agreement with the 45° line 88 over a range of velocities extending from 0 to about 8 feet per second. Over this range, the two methods of measurement are substantially equivalent, so it would be useful to use the method of the present invention either as a measuring means or as a comparison means for calibrating a flowmeter. The departure of the points of curve 86 from the straight line 88 at higher measured velocities is reported because it was observed but is attributed to correctable defects in the measuring technique.

The method of the present invention has been applied using other correlators than that indicated in FIG. 6. In particular, it has been applied using a Hewlett-Packard 2100 minicomputer with a Model 5451B digital Fourier analyzer. This provided a sharper calibration correlation and verified the satisfactory results obtained earlier. However, the cost of such an item of equipment is sufficiently great that it would be most desirable to use the present method with such a correlator only to calibrate flowmeters. A continuing measurement of flow that tied up such a computer and analyzer would be an uneconomic use of the computer. Except for this fact and for the fact that correlation measurements require at least a minute for the gathering of data, the subject invention would be useful as a means of measuring velocity and also as a means of providing calibration of other velocity-measuring means.

The embodiments of the invention in which an exclusive property or privilege is claimed are defined as follows:

1. A flowmeter for measuring the velocity of flow of an electrically conducting fluid in a flow channel comprising:
   a. means for establishing a first magnetic field in a first region along the flow channel of the electrically conducting fluid, said magnetic field having a component substantially perpendicular to the direction of flow of the electrically conducting fluid;
   b. a first pair of electrodes placed in said conducting fluid within the magnetic field of the means for establishing a first magnetic field in a plane substantially perpendicular to the direction of flow of the conducting fluid and responsive to the flow of the conducting fluid in the magnetic field of the first magnetic means to detect the resulting electromotive force to generate therefrom a first signal;
   c. means for establishing a second magnetic field at a second location distinct from the first location and on the flow channel of the electrically conducting fluid, the magnetic field generated by said means for generating a second magnetic field producing a component of magnetic field substantially perpendicular to the direction of flow of the electrically conducting fluid at the second location;
   d. a second pair of electrodes placed in the electrically conducting fluid at a second position in the flow channel that is displaced along the flow channel a known distance from the position of the first pair of electrodes and that is in the magnetic field produced by the means for establishing the second magnetic field, said second pair of electrodes responsive to the electromotive force generated by the flow of the electrically conducting fluid in the magnetic field generated by the second magnetic means to produce from said electromotive force a second signal; and
   e. correlation means coupled to said first and second pairs of electrodes and responsive to said first and second signals and, including means for inserting a variable time delay between said first and second signals from said first and second pairs of electrodes to determine a time delay that produces a maximum value of cross-correlation between the a-c portions of said signals from said first and second pairs of electrodes, which time delay is a measure of the time necessary for the electrically conducting fluid to flow from the first to the second location and hence of the velocity of the electrically conducting fluid.

2. The flowmeter of claim 1 wherein said means for establishing a magnetic field comprise a permanent magnet.

3. The flowmeter of claim 1 wherein said means for establishing a magnetic field comprise an electromagnet connected to an electric power supply.

4. The flowmeter of claim 1 wherein said correlation means comprise an electronic correlator.

5. The flowmeter of claim 1 wherein said correlation means comprise an electronic computer adapted to perform a cross-correlation.

6. The flowmeter of claim 1 wherein said correlation means comprise:
   a. a first amplifier connected to said first pair of electrodes to produce therefrom a first amplified signal;
   b. a second amplifier connected to said second pair of electrodes to produce therefrom a second amplified signal;
   c. a first electrical filter connected to said first amplifier and responsive to said first amplified signal to attenuate therein harmonics of a power-supply frequency and to produce therefrom a first filtered signal;

d. a second electrical filter connected to said second amplifier and responsive to said second amplified signal to attenuate therein harmonics of a power-supply frequency and produce therefrom a second filtered signal;

e. an electronic correlator connected to said first and second electrical filters and responsive to said first and second filtered signals to determine the correlation delay therebetween;

f. an oscilloscope connected to said electronic correlator to display the correlation delay between said first and second filtered signals, which correlation delay is a measure of the time taken by the fluid to travel the known distance and hence of the velocity of the fluid.

7. A method of measuring the flow of an electrically conducting fluid comprising the steps of disposing a first electromagnetic flowmeter at a first location in the fluid in the flow channel; disposing a second electromagnetic flowmeter at a second location in the fluid in the flow channel; and coupling the outputs of the first and second electrogmagnetic flowmeters to a statistical correlator to determine the time delay between the a-c portions of the signals from the first and second electromagnetic flowmeters that produces maximum correlation between the two signals, which time delay is a measure of the time taken by fluid to flow between the first and second electromagnetic flowmeters.

8. A method of measuring the flow rate of an electrically conducting fluid comprising the steps of:

a. establishing a first static magnetic field having a first component at a first location in the fluid and normal to the direction of flow;

b. detecting the first electromotive force induced by the flow of the conducting fluid normal to the first component;

c. establishing a second static magnetic field having a second component at a second location in the fluid a known distance from the first location and normal to the direction of flow;

d. detecting the second electromotive force induced by the flow of the conducting fluid normal to the second component; and e. measuring the statistical correlation time between the first and second electromotive forces, which statistical correlation time when divided into the known distance produces as a quotient the flow rate of the fluid.

* * * * *